United States Patent [19]

Hashimoto et al.

[11] Patent Number: 5,017,764
[45] Date of Patent: May 21, 1991

[54] APPARATUS FOR DRIVING CARD-LIKE RECORD MEDIUM

[75] Inventors: Akihiko Hashimoto; Toshihiro Kitahara; Hiroshi Miyajima, all of Tokyo, Japan

[73] Assignee: Olympus Optical Co., Ltd., Tokyo, Japan

[21] Appl. No.: 287,040

[22] Filed: Dec. 21, 1988

[30] Foreign Application Priority Data

Dec. 28, 1987 [JP] Japan .................... 62-330288
Dec. 28, 1987 [JP] Japan .................... 62-330289

[51] Int. Cl.$^5$ .................... G06K 7/10; G06K 7/14
[52] U.S. Cl. .................... 235/454; 235/440; 235/441
[58] Field of Search ............ 235/485, 440, 479, 449, 235/441, 454; 360/2

[56] References Cited

U.S. PATENT DOCUMENTS

| 3,831,188 | 8/1974 | Zupancic | 360/2 |
| 3,836,753 | 9/1974 | Pass | 235/449 |
| 4,377,828 | 3/1983 | Hayman | 235/449 |

FOREIGN PATENT DOCUMENTS 51-47338 11/1976 Japan .
57-30673 7/1982 Japan .

*Primary Examiner*—Harold Pitts
*Attorney, Agent, or Firm*—Parkhurst, Wendel & Rossi

[57] ABSTRACT

A driving apparatus for moving reciprocally a rectangular optical card in a longitudinal direction thereof, including two sets of three edge guide rollers each arranged along respective side edges of the optical card and separated from each other by a distance substantially equal to half of the longitudinal distance of the optical card, two sets of three periphery guide rollers each arranged along respective upper peripheries of the optical card and separated from each other by a distance substantialy equal to half of the longitudinal distance of the optical card, and driving rollers each arranged underneath the respective middle periphery guide rollers. The driving rollers are resiliently urged against the lower surface of the optical card and a shaft to which the driving rollers are secured and a motor connected to the shaft via gears are arranged movably up and down in conjunction with each other.

11 Claims, 4 Drawing Sheets

5,017,764

APPARATUS FOR DRIVING CARD-LIKE RECORD MEDIUM

BACKGROUND OF THE INVENTION

Field of the Invention and Related Art Statement

The present invention relates to an apparatus for driving a rectangular card-like record medium such as magnetic card, IC card, and optical card.

In an optical card reading device for reading recorded data from the optical card, a rectangular optical card is moved reciprocally in a longitudinal direction of the optical card, and an optical head including light source, objective lenses, photodetector, etc. is moved in a direction perpendicular to the longitudinal direction of the optical card.

In the known optical card reading device, it has been known to utilize a card holder called a shuttle. That is to say, the optical card is inserted into the shuttle, and then the shuttle is set in the device and moved reciprocally.

In the known card driving apparatus using the shuttle, since the shuttle is very heavy compared with the optical card, it is necessary to use an electric motor of a large size which is expensive and also requires a large power consumption. Further, when the moving direction is inverted, there is produced a rather large mechanical shock, so that the shuttle and thus the optical card could not be moved precisely at a given constant speed. Moreover, the mechanism for moving the heavy shuttle is liable to be complicated in construction and large in size, and thus the whole system tends to be large and expensive.

In order to solve the above mentioned problem, it is considered that the optical card is moved by driving rollers which are directly urged against the optical card. In this case, when the driving rollers are arranged fixedly, it is difficult to move the optical card stably due to the variation in the thickness of particular optical cards and that between respective optical cards.

In Japanese Utility Model Publication No. 51-47,338, there is described the card driving apparatus comprising a guide having a recess formed in one side edge thereof for receiving one side edge of the card, a pair of guide rollers which are resiliently urged against the other side edge of the card, and a pair of driving rollers between which the card is clamped.

There have been proposed various kinds of optical cards having different formats. In one kind of optical card, the optical card has a rectangular contour configuration, a seek area is formed at a middle portion viewed in a longitudinal direction of the card to extend in a width direction perpendicular to the longitudinal direction, and a pair of data areas are formed on respective sides of the seek area. In the seek area, there has been previously recorded various kinds of data for seeking data tracks. When the optical card having the format just explained above is used in the card driving apparatus disclosed in the Japanese Utility Model Publication No. 51-47,338, there might occur the following problem. The data written on the data areas is read out by moving the card reciprocally, so that the card has to be moved over a distance substantially equal to the length of the card. Therefore, when the two guide rollers are separated from each other by a distance substantially equal to the length of the card while an optical head of the reading apparatus is positioned at a middle point between the guide rollers, only one of the guide rollers is urged against the card during the reading of data from a data area. Therefore, the card could not be pressed against the recess of the guide member stably and the data could not be read out accurately due to large focusing and tracking errors. When the guide rollers are arranged closer to each other such that they are always brought into contact with the card, the length of the data areas has to be made small, and thus the memory capacity of the card is limited to a great extent.

In order to avoid the above explained problem, it is considered that a number of guide rollers are arranged along the card traveling path. However, this solution will arise other problems such as complicated construction and increase cost.

SUMMARY OF THE INVENTION

The present invention has for its object to provide an apparatus for driving a card-like record medium in a stable manner, while the apparatus can be constructed simply and cheaply.

According to the invention, an apparatus for driving a rectangular card-like record medium having longer side edges, shorter side edges and one and the other surfaces, data to be read out being recorded on the one surface, comprises:

first guide means for guiding the longer side edges of the card-like record medium such that said longer side edges are moved along predetermined passages;

second guide means for guiding the one surface of the card-like record medium such that said one surface of the card-like record medium is positioned at a predetermined level at least at a position for reading data out of the card-like record medium; and driving means for moving reciprocally the card-like record medium in a longitudinal direction of the card-like record medium and having at least one driving roller which is brought into contact with the other surface of the card-like record medium, while the long side edges and one surface of the card-like record medium are guided by said first and second guide means.

DESCRIPTION OF THE PREFERRED EMBODIMENTS

Figure 1:
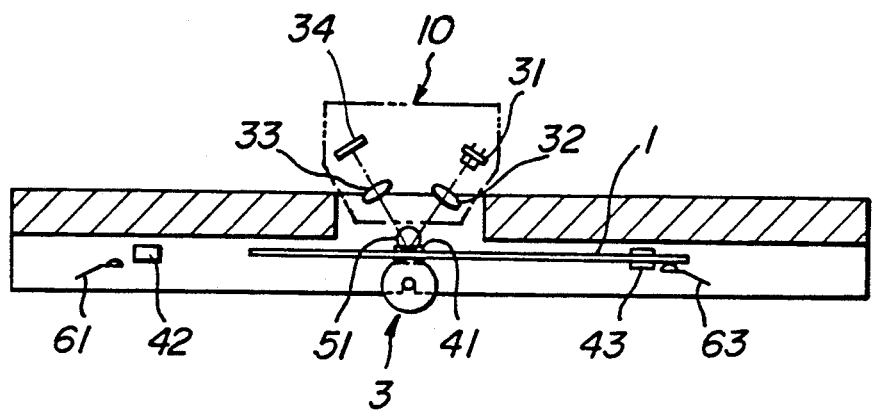
FIG. 1 is a schematic cross sectional view showing an embodiment of the card driving apparatus according to the invention.
Figure 2:
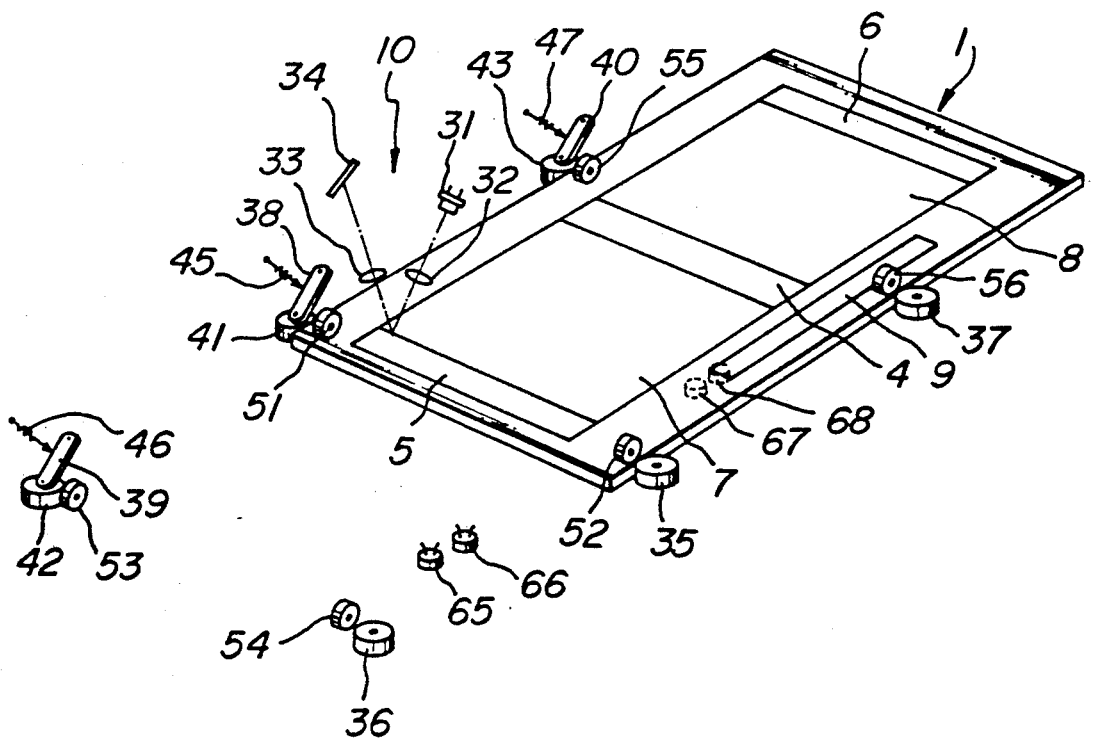
FIG. 2 is a perspective view illustrating the guide means of the apparatus shown in FIG. 1.

FIGS. 1–5 show an embodiment of the driving apparatus according to the invention. In this embodiment, a rectangular optical card 1 is to be moved in its longitudinal direction along a lower surface of a frame 2 by means of a driving roller mechanism 3. As shown in FIG. 2, the optical card 1 includes seek areas 4, 5, 6 formed in the width direction of the card at a middle portion and both end portions viewed in the longitudinal direction of the card, first and second data areas 7 and 8 formed between the seek areas 4 and 5 and the seek areas 4 and 6, respectively, and a position detecting mark 9 formed along one side edge of the card. The optical card 1 is fed such that the above mentioned seek area 4, 5, 6, data areas 7, 8 and position detecting mark 9 are faced upward. In the middle seek area 4 there is recorded track address data for both the first and second data areas 7 and 8, in the seek areas 5 and 6 there is recorded track address data for the first and second data areas, respectively.

Figure 3:
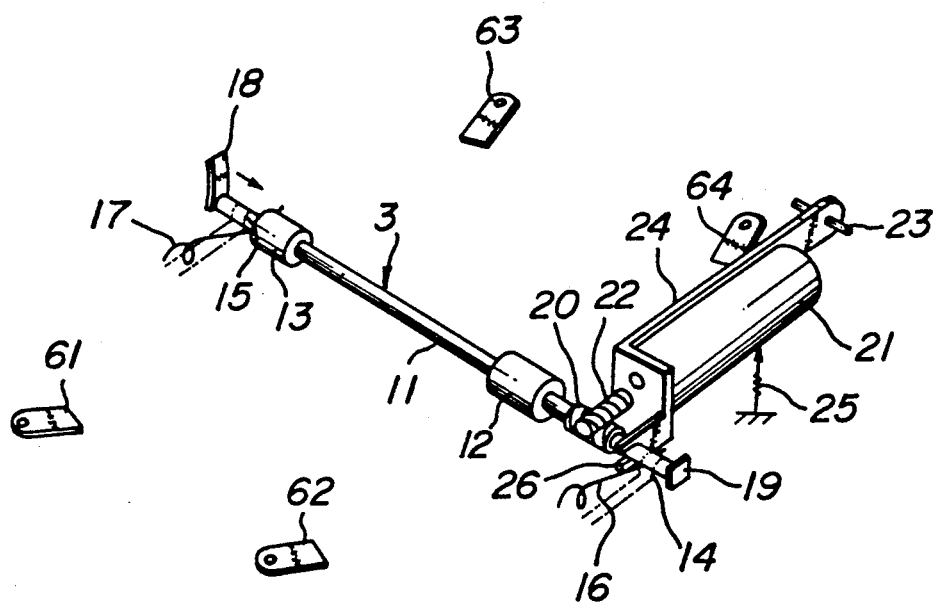
FIG. 3 is a perspective view depicting the driving roller mechanism of the apparatus illustrated in FIG. 1.
Figure 4:
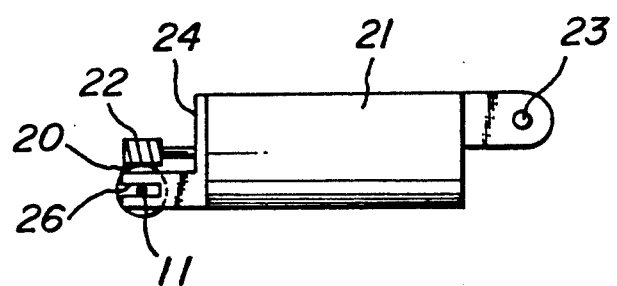
FIG. 4 is a side view of the motor arrangement.

As illustrated in FIG. 3, the driving roller mechanism 3 is arranged under the optical card 1 at a position at which a reading head 10 is provided, and comprises a pair of rubber rollers 12, 13 secured to a rotating shaft 11, the rubber rollers being urged against the lower surface of optical card 1. Both ends of the shaft 11 are inserted rotatably into recesses 14, 15 formed in the frame 2 such that the shaft can be moved up and down, i.e. in the thickness direction of the optical card 1. To the frame 2 are secured springs 16 and 17 which push the shaft 11 upward, so that the rubber rollers 12, 13 are resiliently urged against the rear surface of the optical card 1. In order to restrict the movement of the shaft 11 in its axial direction, one end of the shaft is pushed by a leaf spring 18 such that the other end of the shaft is urged against a stopper 19 secured to the frame 2. To the shaft 11 is secured a gear 20 which is engaged with a worm gear 22 coupled with an output shaft of a motor 21, so that the shaft 11 and thus the rubber rollers 12, 13 are rotated by means of the motor. As shown in FIGS. 3 and 4, the motor 21 is secured to a plate 24 which is swingably journaled to a shaft 23 secured to the frame 2, and the plate 24 is biased to rotate in the counter-clockwise direction in FIG. 4 by means of a spring 25. It should be noted that the force of the spring 25 should be smaller than that of the springs 16, 17. In a free end of the lever 24, there is formed a recess 26 into which the shaft 11 is slidably clamped, so that the plate can be swing in conjunction with the up and down movement of the shaft. Therefore, even if the shaft 11 is moved up and down due to the variation in the thickness of the optical card 1, the motor 1 can be swung in accordance with the up and down movement of the shaft, and thus the gears 20 and 22 can be always engaged with each other positively. In this manner, the driving force of the motor 21 can be transmitted to the driving roller mechanism 3 in a stable and positive manner.

As best shown in FIG. 1, the reading head 10 comprises light emitting diode (LED) 31, illuminating lens 32, imaging lens 33 and photodetector 34. Light emitted from the LED 31 is projected by means of the illuminating lens 32 onto the optical card 1 as a light spot, and an image of an illuminated portion of the optical card 1 is formed by means of the imaging lens 33 upon the photodetector 34. The reading head 10 further comprises focusing and tracking control devices which are known in the art and are not shown in the drawings for the sake of simplicity. Further, in order to seek a desired data track on the optical card 1, the reading head 10 is moved in the width direction of the optical cad which is perpendicular to the feeding direction of the optical card.

In the present embodiment, to the frame 2 are arranged rotatably three edge guide rollers 35, 36, 37 along which one side edge of the optical card 1 is guided. Among these edge guide rollers, the center edge guide roller 35 is aligned with the read out position of the reading head 10, and the edge guide rollers 36, 37 are arranged such that they are separated from each other by a distance substantially equal to the length of the optical card 1 and are symmetrical with respect to the center edge guide roller 35. In order to guide the other side edge of the optical card 1, there are arranged edge guide rollers 41, 42 and 43 which face to the edge guide rollers 35, 36 and 37, respectively, viewed in the width direction of the optical card. The edge guide rollers 41, 42 and 43 are secured rotatably to arms 38, 39 and 40, respectively, and the arms are biased by springs 45, 46 and 47, respectively, to rotate such that the edge guide rollers are resiliently urged against the optical card.

Figure 5:
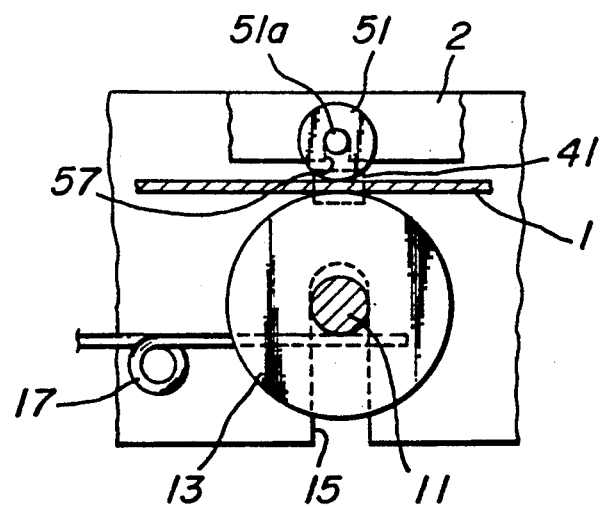
FIG. 5 is a cross sectional view showing the manner of supporting the driving roller shaft.

In the present embodiment, since the reading head 10 is arranged above the optical card 1, the upper surface of the optical card has to be positioned precisely. To this end, periphery guide rollers 51 to 56 are arranged near the edge guide rollers 35-37 and 41-43, respectively. As shown in FIG. 5, the central periphery guide roller 51 is secured to a shaft 51a which is rotatably clamped into a recess 57 formed in the frame 2 and is movable up and down. The other central periphery guide roller 52 arranged near the central edge guide roller 35 is also supported in the same manner as that explained just above. Shafts of the remaining periphery guide rollers 53-56 are movably inserted into the recess formed in the frame 2 in such a manner that they can move up and down. When the optical card 1 is not introduced into the apparatus, the central periphery guide rollers 51 and 52 are supported by the rubber rollers 13 and 12, respectively, but since no roller is arranged underneath the remaining periphery guide rollers 53-56, suitable members such as spring strips are arranged to close the openings of the recesses into which the shafts of the rollers 53-56 are inserted so that the rollers 53-56 do not fall down from the recesses. In order to urge the upper surface of the optical card 1 against the periphery guide rollers 51-56 effectively, pushing springs 61-64 are arranged underneath the optical card such that they are brought into contact with the optical card. These pushing springs 61-64 are secured to the frame 2. It should be noted that the driving roller mechanism 3 also serves to urge the optical card against the periphery guide rollers 51-56.

Figure 6:
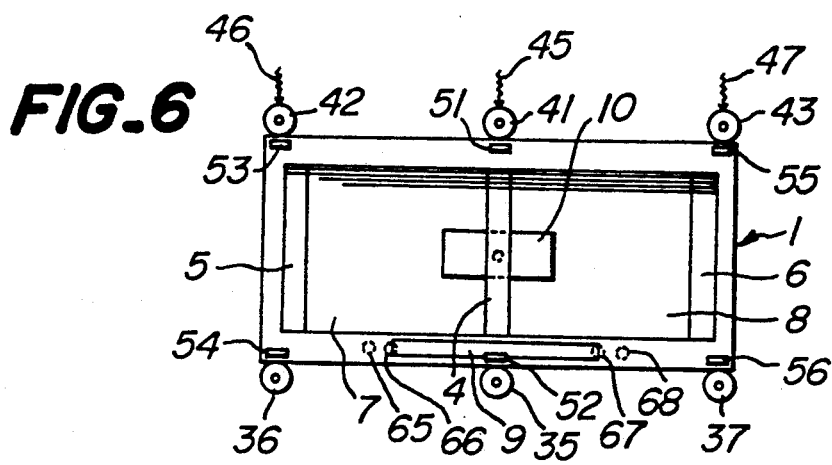
FIGS. 6, 7 and 8 are plan views depicting the operation of the apparatus.
Figure 7:
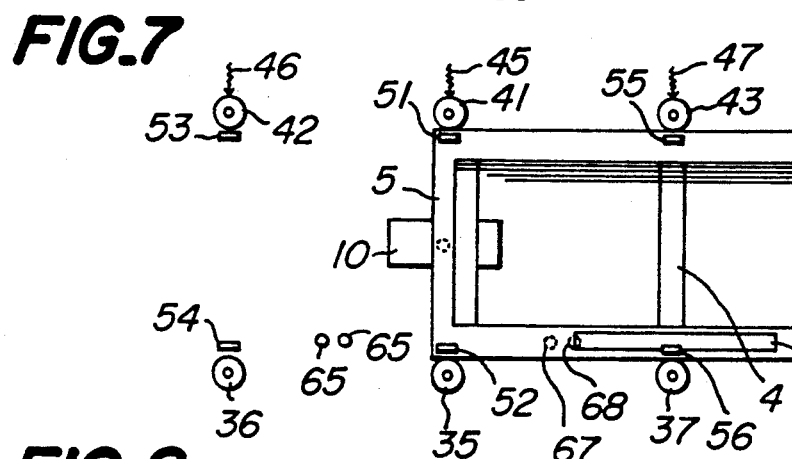
Figure 8:
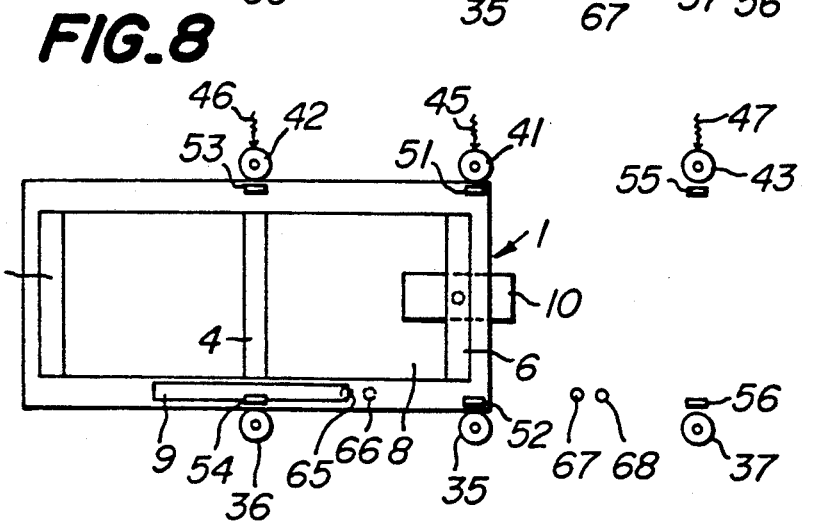

In order to detect the position detecting mark 9 of the optical card 1, photoreflectors 65-68 each having light emitting and receiving elements are arranged in such a manner that two photoreflectors 65 and 66 and two photoreflectors 67 and 68 are paired, respectively. In accordance with output signals from the photoreflectors 65-68 the rotational direction of the motor 21 is controlled such that the optical card 1 is moved reciprocally over a distance substantially equal to a half of the length of the optical card so that one of the data areas 7 and 8 can be read out. When the optical card 1 is inserted into the frame 2, the insertion is detected by a suitable detector not shown and the motor 21 is driven such that the central seek area 4 is aligned with the read out position of the reading head 10 as illustrated in FIG. 6. In this condition, all the edge guide rollers 35-37 and 41-43 are urged against the side edges of the optical card 1, and the photoreflectors 66, 67 detect the position detecting mark 9. Then, the reading head 10 is moved in the width direction of the optical card along the seek area 4 to seek a desired data track. When the desired data track is found, the reading head 10 is stopped and then the optical card 1 is moved reciprocally between the position shown in FIG. 6 and the position illustrated in FIG. 7 in which the read out position of the reading head 10 is aligned with the seek area 5 of the first data area 7. That is to say, the optical card 1 is moved reciprocally over the distance substantially equal to a half of the length of the optical card. In the condition shown in FIG. 7, the edge guide rollers 35, 37 are urged against one side edge of the optical card and the edge guide rollers 41, 43 are brought into contact with the other side edge of the optical card, and the photoreflector 68 detects the position detecting mark 9. When desired data to be read out is recorded in the second data area 8, the optical card is moved between the position shown in FIG. 6 and the position depicted in FIG. 8 in which the reading head 10 is aligned with the seek area 6. In the condition shown in FIG. 8, the edge guide rollers 35, 36 and 41, 42 are urged against respective side edges of the optical card, and the photoreflector 65 detects the position detecting mark 9.

In the present embodiment, when the optical card 1 is read out, two or three edge guide rollers are always brought into contact with respective side edges of the optical card. Moreover, during the reciprocal movement, even if mechanical shock is generated when the corners of the optical card hit against the edge guide roller pair 36, 42 or 37, 43, the data can be read out accurately, because at this movement the seek area 4 is positioned under the reading head 10. Further, when the optical card 1 is moved from the condition shown in FIG. 6 into the condition illustrated in FIGS. 7 or 8, the edge guide rollers 36, 42 or 37, 43 depart from the optical card, so that no shock is generated. According to the present embodiment, the driving roller mechanism 3 is arranged immediately below the read out position of the reading head 10 and is biased upwardly, so that any bending of the optical card can be corrected effectively. Further, the driving roller mechanism 3 as well as the motor 21 are movable in the thickness direction of the optical card, and thus the optical card can be always moved stably and positively. Therefore, the data can be read out of the optical card 1 in an accurate manner. Moreover, the optical card 1 is moved over a distance substantially equal to a half length of the optical card, so that the data areas 7, 8 can have a wide area. It should be noted that it is sufficient to provide only three edge guide rollers on respective sides of the optical card, and thus the whole construction is simple and economical.

Figure 9:
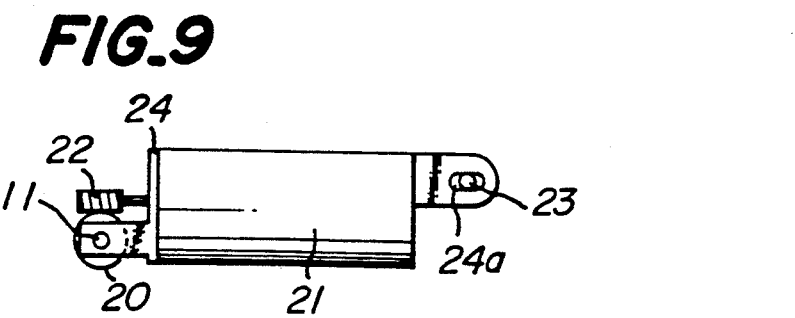
FIG. 9 is a side view illustrating another embodiment of the motor arrangement.

The present invention is not limited to the embodiments explained above, but many modifications may be conceived by those skilled in the art within the scope of the invention. In the above embodiment, both side edges of the optical card are guided by the edge guide rollers 35-37, 41-43, but the edge guide rollers 41-43 may be replaced by an elongated leaf spring or an elongated recess which extends along the side edge of the optical card. In the above embodiment, the recess 26 is formed in the plate 24 to which the motor 21 is secured and the shaft 11 of the driving roller mechanism 3 is inserted into the recess 26 such that the motor 21 is moved in conjunction with the up and down movement of the driving roller mechanism due to the variation in the thickness of the optical card and thus the gears 20 and 22 are always engaged with each other positively. FIG. 9 illustrates another embodiment in which the shaft 11 is inserted into a hole formed in the plate 24 and the shaft 23 is inserted into an elongated hole 24a formed in the plate 24. Further, in the above embodiment, the periphery guide rollers 51-56 are brought into contact with the upper surface of the optical card, but the upper surface of the optical card may be guided into position by directly bringing the upper surface of the optical card into contact with the lower surface of the frame 2. In such a case, the periphery guide rollers are omitted. Alternatively, the driving roller mechanism 3 may be arranged above the optical card and the lower surface of the optical card may be guided in position. It is not always necessary to arrange the driving roller mechanism 3 in alignment with the read out position. It should be noted that the apparatus according to the invention may be equally applied not only to the optical card, but also to another card-like record medium such as an optical card having different format, magnetic card and IC card.

What is claimed is:

1. An apparatus for driving and optically interacting with a rectangular card-like medium having long side edges, short side edges and first and second opposing surfaces, data to be read from the record medium being recorded on a plurality of longitudinally extending tracks formed on said first surface of the record medium, the apparatus comprising:

a first and a second pair of central rollers having rotational axes extending substantially perpendicular to the tract direction, each roller of said first pair of central rollers and each roller of said second pair of central rollers being spaced from each respective paired roller by a distance substantially equal to a thickness of the record medium held therebetween, said first pair of central rollers being spaced from said second pair of central rollers by a distance substantially equal to a width of the record medium;

means for rotationally driving a driving roller of said first pair of central rollers and a driving roller of said second pair of central rollers contacting the second surface of the record medium, which thereby drive the record medium in a direction of the tracks; and reading head means for reading data from the record medium by illuminating a beam spot on said first surface of the record medium, said reading head means being arranged in a vicinity of a plane passing through the rotational axes of said first pair of central rollers and said second pair of central rollers which extends substantially perpendicular to the plane of said record medium.

2. The apparatus of claim 1, wherein said first pair of central rollers and said second pair of central rollers each comprise at least one spring member, said first pair of central rollers and said second pair of central roller being urged into contact with said first surface of the record medium and said second surface of the record medium by an elastic force of said at least one spring member.

3. The apparatus of claim 1, wherein said first pair of central rollers and said second pair of central rollers contact the record medium at a periphery of the first and second opposing surfaces thereof adjacent the long side edges.

4. The apparatus of claim 1, further comprising pushing springs disposed adjacent said second surface of the record medium for upwardly biasing the record medium.

5. The apparatus of claim 1 further comprising two pairs of photoreflectors disposed adjacent said second surface of the record medium for interacting with a positional detecting mark of the record medium to control movement of the record medium.

6. The apparatus of claim 1, further comprising a first and a second pair of guide rollers contacting a periphery of the first and second opposing surfaces of the record medium adjacent the long edges, each roller of said first pair of periphery guide rollers and each roller of said second pair of periphery guide rollers being spaced from each respective paired roller by a distance substantially equal to the record medium width, said first pair of periphery guide rollers being spaced from said second pair of periphery guide rollers by a distance substantially equal to a length of the record medium, and the rollers of said first pair of central rollers and second pair of central rollers contacting said first surface of the record medium being disposed in a middle location between said first pair of periphery guide rollers and said second pair of periphery guide rollers.

7. The apparatus of claim 6, wherein said first pair of periphery guide rollers and said second pair of periphery guide rollers and rollers of said first pair of central rollers and said second pair of central rollers contacting said first surface of the record medium are vertically moveable.

8. The apparatus of claim 6, further comprising a first, a second, and a third pair of rollers disposed on opposing long edges of the record medium, each roller of said first pair of edge rollers; each roller of said second pair of edge rollers and each roller of said third pair of edge rollers being spaced from each respective paired roller by a distance substantially equal to the record medium width, said first pair of edge rollers being spaced from said second pair of edge rollers by distance substantially equal to a record medium length, and said third pair of edge rollers being disposed in a middle location between said first pair of edge rollers and said second pair of edge rollers.

9. The apparatus of claim 8, further comprising spring members for resiliently biasing one roller of said first pair of edge rollers, one roller of said pair of edge rollers and one roller of said third pair of edge rollers each contacting one long edge of the record medium toward the other long edge of the record medium.

10. The apparatus of claim 9, said driving means further comprising a shaft to which the driving roller of said first pair of central rollers and the driving roller of said second pair of central rollers are secured and spring members for resiliently urging the driving roller of said first pair of central rollers and the driving roller of said second pair of central rollers against said second surface of the record medium.

11. The apparatus of claim 10, said driving means further comprising a first gear secured to the shaft, a motor having an output shaft, a second gear secured to the output shaft of the motor and engaged with said first gear, means for supporting the motor such that the motor is swingable in a direction of thickness of the record medium, and a spring for biasing the supporting means such that said second gear is maintained in positive, constant engagement with said first gear.

* * * * *